United States Patent [19]
Park et al.

[11] Patent Number: 5,799,163
[45] Date of Patent: Aug. 25, 1998

[54] OPPORTUNISTIC OPERAND FORWARDING TO MINIMIZE REGISTER FILE READ PORTS

[75] Inventors: Heonchul Park, Cupertino; Seungyoon P. Song, Los Altos, both of Calif.

[73] Assignee: Samsung Electronics Co., Ltd., Seoul, Rep. of Korea

[21] Appl. No.: 811,188

[22] Filed: Mar. 4, 1997

[51] Int. Cl.[6] ............................... G06F 9/34; G06F 9/38
[52] U.S. Cl. .............................. 395/381; 395/390
[58] Field of Search ............................ 395/381, 390

[56] References Cited

U.S. PATENT DOCUMENTS

| | | | |
|---|---|---|---|
| 4,320,454 | 3/1982 | Suzuki | 395/381 |
| 4,924,377 | 5/1990 | Kuriyama et al. | 395/381 |
| 5,123,108 | 6/1992 | Olson et al. | 395/394 |
| 5,274,776 | 12/1993 | Senta | 395/570 |
| 5,619,668 | 4/1997 | Zaidi | 395/376 |
| 5,638,526 | 6/1997 | Nakada | 395/394 |

*Primary Examiner*—Krisna Lim
*Attorney, Agent, or Firm*—Skjerven, Morrill, MacPherson, Franklin & Friel LLP; Alan H. MacPherson; David T. Millers

[57] ABSTRACT

Instruction issue rate is enhanced by passing multiple instructions to a read stage when the number of required source operands exceeds the read capability of a register file but operand forwarding reduces the number of reads required. The multiple instructions can be issued for execution with source operands read from the register file and source operands forwarded from execution units without using maximum number of register file read ports in a superscalar vector processor architecture. Even when there is both inter-instruction data dependency and there are more source operands for, say, two instructions, to be fetched than available register file read ports, if some of the source operands can be obtained via result forwarding and the rest of the operands can be obtained via available register file read ports, the two instructions can be issued simultaneously. In an alternative embodiment, operand masking is implemented, which complicates the original scheme, as source operand mask and the mask of the result to be forwarded has to match.

9 Claims, 1 Drawing Sheet

OPPORTUNISTIC OPERAND FORWARDING TO MINIMIZE REGISTER FILE READ PORTS

CROSS-REFERENCES

The present application is related to co-owned U.S. applications Ser. No. 08/805,389 filed Feb. 24, 1997, entitled "DEFERRED STORE DATA READ WITH SIMPLE ANTI-DEPENDENCY PIPELINE INTERLOCK CONTROL IN SUPERSCALAR PROCESSOR," currently pending, and Ser. No. 08/805,392 filed Feb. 24, 1997, entitled "MULTIFUNCTION DATA ALIGNER IN WIDE DATA WIDTH PROCESSOR," currently pending, which are herein incorporated by reference.

BACKGROUND

1. Field of the Invention

This invention relates to processor architectures and particularly to circuits and methods for issuing multiple instructions per clock cycle.

2. Description of Related Art

Typically, an instruction is carried out by a processor in five stages: an instruction fetch stage, a decode stage, an operand fetch stage, an execution stage, and a write stage. During the instruction fetch stage, a next instruction to be carried out is fetched from a memory location pointed to by a program counter, and is stored in an instruction register. During the decode stage, the fetched instruction is analyzed to find out the addresses of source operands and the opcode (OPeration CODE), which is a part of the instruction. The source operands are fetched from memory (or a register) at the addresses obtained from the decode stage during operand fetch stage. The execution stage is when an operation specified by the opcode is performed on fetched operands. (Sending the fetched source operands to an execution unit so that they will be processed according to the decoded opcode is called "issuing an instruction".) If a result is produced during the execution stage, it is written to a register during the write stage.

Superscalar computer architecture refers to an implementation capable of issuing, i.e., executing, more than one instruction per processor clock cycle. An N-way superscalar design can issue up to N instructions every clock cycle. However, the actual instruction issue rate is less than N instructions per cycle for several reasons. One reason is data dependency between an instruction to be issued and a previously issued one. If execution of an earlier instruction updates a piece of data that will be used as an operand of a later instruction, the later instruction cannot be executed until the earlier instruction is completed. In fact, the later instruction typically cannot be executed until the results of the earlier instruction are available. Such results are available and stored in one or more register files one clock cycle after completion of the execution stage that generates the result. The delay in fetching the source operands is one reason for decreased instruction issue rate. Another reason for decreased instruction issue rate is that, at times, the number of currently available read ports of a register file, from which operands are fetched, is less than the number of source operands required from that register file for multiple instructions. In this case, fewer instructions advance from the read stage and become eligible for issue. One way to avoid this problem is to equip each register file with the maximum number of read ports that will be ever needed. But having many read ports increases the hardware implementation cost without a proportionate increase in performance.

A scheme that will keep the hardware cost moderate and yet improve the issue rate is desired.

SUMMARY

In accordance with the present invention, a vector processor improves issue rate not only by providing result forwarding but also by intelligent exploitation of data dependency. When an execution of a current instruction requires fetching a source operand whose content is valid only when a previous instruction writes its result into the content, the execution of the current instruction has to be delayed until the completion of the previous instruction. Such source operand update usually involves at least one clock cycle delay, since the result has to be written into a register file through a latch. Result forwarding eliminates this delay by fetching the result directly from an execution unit, bypassing the latch and the register file. Taking a further step, when there are not enough register file read ports to fetch the required source operands but some of the source operands depend on execution of previous instructions, the lack of read ports can be resolved by fetching those dependent source operands by result forwarding and the rest of the source operands by usual via the read ports.

DETAILED DESCRIPTION

Figure 1:
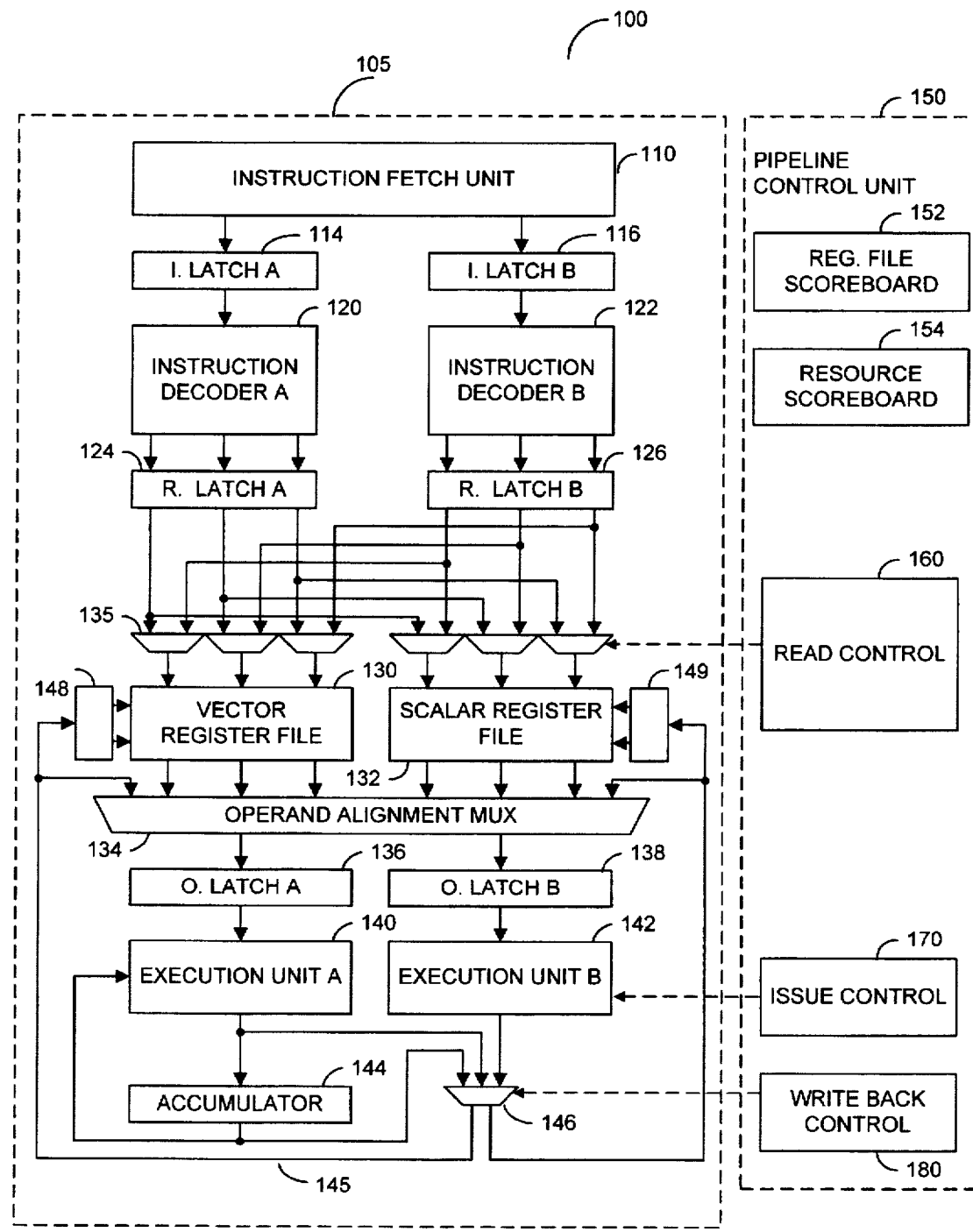
FIG. 1 shows an exemplary vector processing core of a pipelined superscalar computer.

FIG. 1 illustrates an embodiment of the present invention, a dual pipeline superscalar processor 100, which has a target issue rate of two instructions per clock cycle, which includes an instruction execution module (IEM) 105 and a pipeline control unit (PCU) 150. Processor 100 has an SIMD (Single Instruction Multiple Data) architecture and normally carries out five stage execution pipelines including an instruction fetch stage, a decode stage, an operand fetch stage, an execution stage, and a write stage.

Each instruction is a 32-bit word. In each instruction fetch stage, Instruction Fetch Unit (IFU) 110, with a 128-bit input channel, fetches up to four instructions at a time and passes up to two instructions respectively to Instruction Decoder A 120 and Instruction Decoder B 122 via Instruction Latch A 114 and Instruction Latch B 116, respectively. (Although there are only two instruction decoders 120 and 122, the IFU 110 tries to fetch as many as four instructions as possible, since fetching of two instructions at a time is not always guaranteed. Once in a while, only one instruction or none may be fetchable. In this case, if more than two instructions were fetched in the previous fetch stage, the "surplus" instruction(s) can be sent to the-instruction decoder(s) in the next stage so that the following decoding stage would be still productive.) After the instructions are decoded, the register numbers for their source operands are sent to one or both of Vector Register File (VRF) 130 and Scalar Register File (SRF) 132 through Read Latch A 124, Read Latch B 126 and multiplexers 135. VRF 130 includes 64 vector registers $VR_0$ to $VR_{63}$, and each vector register contains 32 bytes of data that can be divided into 32 8-bit data elements, 16 16-bit data elements, or 8 32-bit data elements. SRF 132 includes 32 32-bit scalar registers. According to the register numbers received from decoders 120 and 122, register files 130 and 132 output source operands to Execution Unit A 140 and Execution Unit B 142 via Operand Alignment MUX 134, Operand Latch A 136 and Operand Latch B 138.

VRF 130 and SRF 132 each has three read ports from which up to three source operands can simultaneously be read out. That is, up to three scalar operands and three vector operands can be given to the Operand Alignment MUX 134, which routes each operand to its destined execution unit 140 or 142 via respective operand latch 136 or 138. Such routing information is obtained at the decode stage from each decoded instruction. When result forwarding is performed, Operand Alignment MUX 134 receives data from both an execution unit 140 or 142 and the register files 130 and 132, but data from register files are ignored, since they are invalid. Yet the data read-out from register files is not blocked, since this routing is also needed to obtain correct data in case there is a mask mismatch during result forwarding (as explained later).

Execution Units A 140 and B 142 perform operations necessary for execution of the instructions, and the results are stored in destination registers in the VRF 130 and/or SRF 132 via Accumulator 144 and/or multiplexer 146 and latches 148 and 149.

Pipeline Control Unit 150 sends appropriate control signals to operate units of the IEM 105 and is equipped with bookkeeping hardware. Register File Scoreboard 152 is a collection of flags, one for each register in register files 130 and 132. Each flag denotes whether the corresponding register is a destination of an issued instruction, i.e. whether its content is valid yet by being properly updated. Resource Scoreboard 154 indicates the availability of resources in execution unit 140 during subsequent clock cycles.

Since the two register files 130 and 132 have three read ports each, more than one source operand can be read out from each register file into the Operand Alignment MUX (OAM) 134. The source operands read from the register files 130 and 132 may or may not be valid, which is indicated by the bits of the Register File Scoreboard 152. That is, not all source operands that are gated into the OAM 134 are valid. If any of the required source operands for an instruction is not valid yet at the OAM 134, the instruction cannot be issued. It may take more than one clock cycle for an instruction's valid source operands to be readied at the OAM 134 before the instruction's issuance.

Present invention uses result forwarding, which increases instruction issue rate by providing a result directly from an execution unit rather than waiting an extra clock cycle to write the result in a register file and then read the result from the register file. An example of an ordinary routing of a result operand would be from Execution Unit A 140 via latch 148, VRF 130 and then to the Operand Alignment Multiplexer 134. For the result to be available as a source operand in Operand Latch A 136, there is one cycle delay due to writing to VRF 130 via latch 148. Result forwarding (denoted by a branch of data path 145 which starts at multiplexer 146 and reaches OAM 134) bypasses latch 148 and VRF 130, and sends the result directly to the OAM 134 so that the result is available at Operand Latch A 136 as soon as it is computed by the preceding instruction.

The present invention takes a further step from result forwarding to alleviate a bottleneck caused by a register file having fewer read ports than are required for simultaneous issuing of multiple instructions. When the number of source operands for multiple instructions exceeds the number of available read ports of a register file 130 or 132, and some of the source operands depend on the result of an earlier instruction, these operands are obtained directly from execution unit 140 or 142 via result forwarding and the rest of the operands are obtained from register file 130 or 132 via the regular routing. For example, assume two instructions in Instruction Decoders A 120 and B 122 request five operands from VRF 130 which has only three read ports. If two operands depend on the results of one or two instructions being executed ahead, these two operands can be forwarded from execution unit 140 or 142 without any delayed read from register file 130. The other three operands can be obtained via the regular routing at the available three read ports. Using this method, two instructions can be issued simultaneously, helping a two-way (or dual) superscalar processor reach its optimal two instructions per cycle issue rate.

Note, in the above example, that this scheme works only if the number of lacking read ports is less than or equal to the source operands that can be forwarded.

Another embodiment further includes masking of operands. This exemplary embodiment further includes special registers including two 32-bit Mask Registers, which are not shown in FIG. 1, besides VRF 130 and SRF 132. Some of the instructions employed in a superscalar processor can specify masking in a vector operation. Masking is not used in scalar operations. With masking, data elements of a vector result generated from an execution unit are selectively stored in a destination register. Each bit of a 32-bit mask register is associated with a byte of a data vector, and only the bytes of the data vector result that are indicated by the set mask bits are updated in register file 130 to selectively reflect the vector result.

When forwarding is performed, the masking of the result being forwarded has to match the masking of the source operand, or the result masking should be a superset of the source operand mask. Otherwise, the forwarded result will not provide correct data. For instance, assume the source operand mask was 11110000, and the result mask was 00001111. (In this example, a mask register of only 8 bits and a vector register of 8 bytes are assumed for simplicity. This embodiment actually includes a 32 bit mask register, where each mask bit expresses whether each corresponding bytes in a 32 byte vector register will be used or not.) In this case, result forwarding will not provide the requested data. Thus, the PCU 150 disallows result forwarding. However, if the result mask was 11110000, there is a mask match, and the result forwarding is allowed. Note that, if the result mask was 11111000, 11111100, 11111110 or 11111111, the result can still be forwarded. This exemplifies that a vector result can be forwarded if its mask is equal to or is a "superset" of the source operand mask.

An operand mask mismatch can happen if there was a mask-altering instruction between the result-providing instruction and the current instruction. By default, every vector register is masked with the default masking. There are two ways this default can be changed. By either an explicit mask altering instruction, or one of the instructions in which a user can specify masking information. When a mask altering instruction is issued, the Exception Handling Unit (not shown in FIG. 1) detects change of masking of a vector operand and notifies the Pipeline Control Unit 150, which bars the result forwarding, and issuance of the current instruction is delayed. To obtain a correct result, the result vector is stored in the VRF 130 in the next clock cycle, and from there routed to the OAM 134. This time the PCU approves the validity of the routed operand at the OAM 134 and the operand can be latched at operand latch 136 or 138 for issuance of the instruction.

The above description of the present invention is only illustrative and should not be interpreted as to be limiting.

We claim:

1. A method for executing instructions in a processor, comprising:

(a) fetching instructions;

(b) decoding the fetched instructions;

(c) fetching source operands for each of the fetched instructions by:

(c.1) reading said source operands from register files via register file read ports in response to (i) the number of the source operands being less than or equal to the number of currently available register file read ports, and (ii) the values of said source operands being independent of previously executed instructions;

(c.2) reading said source operands either from register files via register file read ports after said source operands are updated and become available in the register files, or directly from a result of the previously executed instruction in response to (i) the number of the source operands being less than or equal to the number of currently available register file read ports, and (ii) the values of said source operands depending on a previously executed instruction;

(c.3) reading said source operand from register files via register file read ports after enough register file read ports become available in response to (i) the number of the source operands being greater than the number of currently available register file read ports, and (ii) the values of said source operands being independent of previously executed instructions; and (c.4) reading those source operands directly from a result of the previously executed instruction and the rest of the source operands whose values do not depend on said previously executed instruction from register files via register file read ports in response to (i) the number of the source operands being greater than the number of currently available register file read ports, and (ii) the number of said source operands whose values depend on a previously executed instruction being less than or equal to the number of currently lacking register file ports;

(d) applying, in said execution unit, each of the fetched instructions to its fetched operands to produce a result; and (e) storing each said result in a destination operand.

2. The method as in claim 1 wherein the number of the fetched instructions is two.

3. The method as in claim 1 wherein said register files include two vector register files.

4. The method as in claim 3 wherein said register files include a vector register file and a scalar register file.

5. The method as in claim 3 wherein each said register file has three read ports.

6. The method as in claim 1 wherein said instruction issuing scheme can selectively mask one or more data elements of said instruction's source vector operands and destination vector operands.

7. The method as in claim 1 wherein:

(a) said instruction issuing-scheme can selectively mask one or more data elements of said instruction's source vector operands and destination vector operands; and (b) in the steps (c.2) and (c.4), the reading of source operands directly from a result of the previously executed instruction is performed only if the mask of each of said source operands and the mask of a corresponding result match, or the mask of said corresponding result is a superset of the mask of each of said source operands.

8. A method for issuing instructions for execution in a processor, comprising:

simultaneously decoding multiple instructions;

determining whether a register file has sufficient ports for reading source operands that are required for issue of the multiple instructions and are independent of earlier instructions pending completion in the processor;

in response to the register file having sufficient ports, reading from the register file values of source operands that are required for the multiple instructions and are independent of earlier instructions pending completion, forwarding from execution units values of source operands that are required for the multiple instructions and depend on earlier instructions pending completion, and issuing the multiple instructions to the execution units; and in response to the register file not having sufficient ports, selecting from the multiple instructions a first subset such that the register file has sufficient available read ports for source operands that are required for issue of the first subset of instructions and are independent of earlier instructions pending completion by execution units in the processor, reading from the register file values of source operands that are required for the first subset of instructions and are independent of earlier instructions pending completion, forwarding from the execution units values of source operands that are required for the first subset of instructions and depend on earlier instructions pending completion, and issuing the first subset of instructions to the execution units.

9. The method of claim 8, wherein the response to the register file not having sufficient ports further comprises delaying issue of a second subset of instructions from the multiple instructions until the first subset of instructions have issued.

* * * * *